(12) United States Patent
Grott

(10) Patent No.: US 7,771,600 B2
(45) Date of Patent: Aug. 10, 2010

(54) METHODS OF UTILIZING WASTE WATERS PRODUCED BY WATER PURIFICATION PROCESSING

(75) Inventor: Gerald J. Grott, Twentynine Palms, CA (US)

(73) Assignee: Ecycling, LLC, Phoenix, AZ (US)

( * ) Notice: Subject to any disclaimer, the term of this patent is extended or adjusted under 35 U.S.C. 154(b) by 0 days.

(21) Appl. No.: 11/885,852

(22) PCT Filed: Mar. 15, 2006

(86) PCT No.: PCT/US2006/009270

§ 371 (c)(1),
(2), (4) Date: Sep. 6, 2007

(87) PCT Pub. No.: WO2006/101881

PCT Pub. Date: Sep. 28, 2006

(65) Prior Publication Data

US 2008/0164213 A1      Jul. 10, 2008

(51) Int. Cl.
*C02F 1/42* (2006.01)
(52) U.S. Cl. .................. 210/660; 210/681; 210/687
(58) Field of Classification Search .................. 210/660, 210/681, 687
See application file for complete search history.

(56) References Cited

U.S. PATENT DOCUMENTS

| 1,947,248 | A | * | 2/1934 | Burks, Jr. | 210/677 |
| 5,304,365 | A | * | 4/1994 | Taborsky | 423/352 |
| 6,374,539 | B1 | * | 4/2002 | Grott | 47/58.1 R |

* cited by examiner

*Primary Examiner*—Chester T Barry
(74) *Attorney, Agent, or Firm*—Barbara J. Luther; Finn T. Simmensen; The Luther Law Firm

(57) ABSTRACT

The invention relates to treating unwanted moderately saline water for producing useful water. The treated water is also suitable for human and livestock consumption. The process includes passing moderately saline waters having 0.05% or more weight and less than 1.00% by weight of the salts of Na, Ca, Mg, Fe, Cl, $SO_4$, or $CO_3$ or combinations thereof through an ion exchange media (FIG. 2). The ion exchange media is pre-treated to be saturated with multivalent cations such as calcium ($Ca^{2+}$) or magnesium ($Mg^{2+}$) ions (FIG. 2). After passing through the ion exchange media, the effluent has decreased sodium cations and increased calcium and/or magnesium cations compared to the pre-treated moderately saline water (FIG. 2). As the moderately saline waters pass through the ion exchange media, the sodium content of the media rises as the multivalent cation content lowers until the media is unacceptable for further water treatment and must be regenerated.

22 Claims, 3 Drawing Sheets

The Water Hardening Process

The Water Softening Process

METHODS OF UTILIZING WASTE WATERS PRODUCED BY WATER PURIFICATION PROCESSING

BACKGROUND OF THE INVENTION

The present invention relates to methods for water purification processing and the economic utilization of waste waters produced from water purification processing.

The disposal of saline water has become an expensive problem for society. For example, approximately 1.61 billion gallons of water containing approximately 800,000 tons of mixed sodium, calcium, magnesium chlorides and sulfates is produced from water treatment operations and oil fields in the state of California alone. This saline water must be disposed of, costing the state of California millions of dollars each year. Meanwhile the United States Geological survey recently determined that New Mexico has an astounding 15 billion acre feet of brackish ground water, and a single basin in West Texas alone was found to have 760 million acre feet of brackish ground water.

Many coal beds are located where traditional mining is not feasible. Instead, the coal beds are stripped of their associated methane which requires pumping water from the coal bed strata Methane migrates to gas wells where it is pumped out and transported for public use. The removed water is typically 900 to 1500 parts per million (ppm) of total dissolved salts (TDS). Unfortunately, the water is typically high in sodium and carbonate and/or bicarbonate.

Meanwhile, the disposal of saline water has become even more problematic in other parts of the world. As a result, billions of dollars are spent each year toward efforts to dispose of saline waters. Accordingly, it would be highly advantageous to provide improved methods of disposing of salty waters. It would even be more advantageous to provide methods of utilizing salty waters which provide a benefit to society, instead of simply disposing of the unwanted waters.

Water purification typically produces a first effluent of relatively "clean water" and a second effluent of "waste water" which includes unwanted contaminates. For purposes herein, clean water is defined to mean water including mean less than 0.05% by weight of the salts of Na, K, Ca, Mg, Fe, Cl, $SO_4$, or $CO_3$ or combinations thereof. Waste water is defined herein to mean water including more than 0.15% by weight of the salts of Na, K, Ca, Mg, Fe, Cl, $SO_4$, or $CO_3$ or combinations thereof. In addition to waste water, there is a substantial amount of "moderately saline water" around the world that has less saline than waste water but which is not generally accepted for irrigation or animal consumption. Thus, this moderately saline water is severely limited for its application and usefulness. As defined herein, "moderately saline water" means water that has 0.05% or more by weight and less than 1.00% by weight of the salts of Na, K, Ca, Mg, Fe, Cl, $SO_4$, or $CO_3$ or combinations thereof.

Known water purification processes proceed by numerous methods including ion-exchange, membrane softening, electrolysis, evaporation and precipitation. The softening of hard water take place by removing calcium and magnesium which is required for both industrial and household use. Known water softening processes proceed either by way of ion-exchange, membrane softening or precipitation. In the ion-exchange processes, the calcium ($Ca^{2+}$) and magnesium ($Mg^{2+}$) ions are exchanged for sodium ($Na^+$) and the regeneration of the ion-exchange media is achieved with a large excess of NaCl. This processes creates a regeneration effluent being a relatively concentrated aqueous solution of sodium, calcium and magnesium chlorides which has to be discarded. Consequently, by this method, considerable amounts of sodium, calcium and magnesium salts in solution must be disposed of.

Alternatively, it is possible to soften water by using weak acid resins which exchange hydrogen ($H^+$) for calcium ($Ca^{2+}$) and magnesium ($Mg^{2+}$), and to regenerate the spent resins with a mineral acid. While this method creates less saline water, it is more expensive and yields relatively acidic soft water which is corrosive. Meanwhile, membrane softening concentrates the calcium, magnesium salts and salts of other divalent ions to produce saline waters which require costly disposal.

The precipitation process has traditionally been carried out by the "lime soda" process in which lime is added to hard water to convert water soluble calcium bicarbonate into water insoluble calcium carbonate. This process also results in waste water which is difficult to filter and requires cumbersome treatment.

My previously issued patent, U.S. Pat. No. 5,300,123 relates to the purification of impure solid salts. Even this process produces salty waste water which must be disposed of. My latter issued patents U.S. Pat. Nos. 6,071,411; 6,374,539 and 6,651,383 relate to the processing and utilization of processed waste waters.

These processes preferably employ ion-exchange, preferably using soluble salts of sodium or calcium, to alter the salt content of treated water. Moreover, the resulting salts, clean effluents and waste water effluents are useful for various applications including for the treatment of soils for improving dust control, soil stabilization, adjusting the soil's sodium adsorption ratio (SAR), and treating root rot.

Unfortunately, even with all of the various water treatment processes of the prior art, there are billions of gallons of moderately saline water that are discarded or not utilized because it is far to expensive to purify such waters using known water treatment processes. This overabundance of salty water is troubling because there is an overwhelming world-wide need for water, particularly for human and livestock consumption. A recent report from the United Nations states that more than 50 percent of the nations in the world will face water stress or water shortages by the year 2025. By 2050, as much as 75 percent of the worlds's population could face water scarcity.

Even more troubling, in impoverished countries, humans and animals often suffer from calcium and magnesium deficiencies even though there may be millions of gallons of nearby saline waters. These saline waters typically contain some calcium and magnesium but contain too much sodium to be drinkable. Unfortunately, due to the expense and unavailability of equipment, this water cannot be processed for human or animal consumption.

Milk is recommended to provide an adequate diet of calcium and magnesium but milk is typically not affordable or available in sufficient quantities to meet the needs of children in developing countries or even the needs of children in poor areas of developed countries. Thus, there would be an incredible development if the saline water could be treated to lower the sodium but increase or maintain the calcium and magnesium to levels suitable for human and livestock consumption.

Water is also in great demand for soil treatment, particularly for irrigation. Unfortunately, moderately saline waters often have saline content which is not suitable for nearby irrigation. Thus, it would be extraordinarily advantageous if an inexpensive process were developed for processing moderately saline waters to produce an effluent suitable for irrigation.

Wind erosion of soil is also significant problem throughout the world. Due to small particle size and poor cohesion, finely divided soil is sensitive to the influence of wind. Such finely divided soil is found in agricultural lands, dunes, lake beds, construction sites and roads under construction. Erosion by wind causes the drifting of masses of soil in the form of dust. The erosion by wind causes the inconvenience of dust formation and the loss of valuable matter such as seed, fertilizer and plantlets. Dust storms are a danger to traffic and a health risk to persons located in the vicinity.

Moreover, the effects of wind erosion on soil can be enhanced by the influence of the sun and rain. The sun causes the evaporization of moisture from soil thereby reducing the cohesion of finely divided soil. Erosion of the soil by rain is caused by rain washing away soil. This is a particular problem when agricultural soil is washed away, damaging plant life and making the soil unusable for agricultural purposes. Further, due to the influence of erosion by rain, the unprotected slopes of ditches, channels, dunes and roads may collapse or be washed away.

Therefore, it is extremely important to prevent the effects of the sun, wind and water in eroding soil. As used herein, soil stabilization refers to the treatment of soils with chemicals to offset the tendencies of soils to be sensitive to small changes in the types of ions in the soil moisture as they effect the plasticity of the soil. For example, swelled clays, those with layers of "bound" water molecules, are more susceptible to movement under load. Soil stabilization of swelled clays can be effected by altering the types and/or amounts of ions in the soil mixture.

It has been proposed to prevent the shift, drift and erosion of soil by treating the surface layers of the soil with water dispersible high polymeric substances of a natural or synthetic nature. Examples of these high polymeric substances include starch ethers, hydrolyze polyacrylonitril, polyvinyl alcohol and carboxyrethyl cellulose. U.S. Pat. No. 3,077,054 discloses the use of polyvinyl acetate as an anti-erosion agent. U.S. Pat. No. 3,224,867 teaches the conditioning of soil with mono starch phosphate. U.S. Pat. No. 5,125,770 teaches treating the soil with a pre-gelatinized starch and a surfactant compound. Furthermore, it has been known to treat dirt roads with relatively pure solid sodium chloride (NaCl), calcium chloride ($CaCl_2$), and mixtures of the two.

There are several drawbacks with the aforementioned soil treating compounds. The polymers mentioned have a relatively high price and have potentially harmful environmental properties. In addition, the starch ethers have proved sensitive to washing out by rain water. As a result, their effectiveness as an anti-erosion agent is severely limited.

An additional problem encountered throughout the world involves fungus. There are millions of acres of land in California, Arizona, New Mexico, Texas and the Sonora and Sinaloa areas of Mexico where crop production is almost impossible due to fungus which attack virtually all dicotyledonous plants of which there are more than 2,000 species. These include cotton, alfalfa and citrus trees. The lack of productivity is due to excessive calcium carbonate in the soil which minimizes swelling to the point that carbon dioxide from decaying humus concentrates to more than about 3.2% $CO_3$, where fungus thrives. These fungus, primarily Phytomatotrichum omnivorim (Shear) Duggar, have three stages of development called the mycelium, conidium and scelerotia. The first stage, referred to as mycelium, involves the development of a fine filament which branches out throughout the soil and forms a tight web around plant roots. After the filament reaches the soil surface, a white mat forms on the surface, referred to as conidium. When mature, the mycelium develops multicellular bodies called scelerotia which can extend to a depth of up to twelve feet into the soil.

About 1970, it was discovered that the addition of sodium to soil offset the excess calcium in the soil. This increased the soil permeability and avoided the build-up of carbon dioxide that permits the root rot to flourish. Sodium chloride has been applied where the soil drains readily and the excess chloride and sodium are leached away by rainfall or irrigation. Meanwhile, sodium sulfate is preferable because 1) the sulfate supplies the nutrient sulfur, 2) the sulfate combines with calcium to form gypsum and gypsum soils typically do not support root rot, 3) gypsum buffers excess sodium assisting its leaching from the soil, and 4) there is no additional chloride residue which can leach into the water table. Unfortunately, sodium sulfate has always been too costly to be used to treat soil for farming. Recently, it has been suggested that solid mixtures of salts removed from water softening processes can be used to control root rot. However, salts removed from water softening are still relatively expensive and the process of utilizing salts recovered from waste water has not been adopted within the agricultural community.

Still an additional problem encountered in agriculture is that soil is often too high in sodium and/or too high in salinity. Farmland and irrigation water is often unacceptably high in sodium. Irrigation waters containing high amounts of sodium salts versus calcium and/or magnesium salts can create a buildup of sodium in the soil. This excess soil results in the dispersion of soil colloidal particles and an increase in soil pH. The dispersion of colloidal particles causes the soil to become hard and compact when dry and increasingly resistant to water infiltration and percolation. The sodium rich soil also becomes resistant to water penetration due to soil swelling when wet.

The total salinity of soil and irrigation water is also of concern. Salinity refers to the total salts within the water, with the significant positive ions (cations) in salinity being calcium, magnesium and sodium and the significant negative ions (anions) being chloride, sulfate and bicarbonate. All irrigation water contains some dissolved salts. When soil has a high content of dissolved salts, or the irrigation waters have sufficient salts to increase the salinity of the soil, the soil has the tendency to hold the water instead of releasing the water for absorption by plant roots by osmotic pressure. Even if the soil contains plenty of moisture, plants will wilt because they cannot absorb necessary water.

Ironically, though there is an overabundance of saline waters that are contaminated with the salts of Na, K, Ca, Mg, Fe, Cl, $SO_4$, and $CO_3$ that, as discussed above, is extraordinarily expensive to dispose of, millions of dollars are spent each year on salts such as sodium chloride for deicing highways. It would thus be advantageous if the salts in saline water could be used for deicing highways.

It would also be highly desirable to provide a method for treating soil that is of low cost and utilizes a material or compound which is readily available. It would be even more advantageous if salty waters could be processed to produce waters useful to treat soil to control dust and effect soil stabilization.

It would also be desirable to provide a method inhibiting root rot in soil.

Moreover, it would be desirable to provide a method of maintaining the proper salinity levels and salinity equilibrium in soil to enhance the agricultural properties of soil.

And of course, it would be most desirable to provide a method of processing waters, particularly those having high sodium content, to produce an effluent having a low sodium content but high magnesium and calcium content for human and animal consumption.

Finally, it would be desirable if all of the aforementioned objectives could be accomplished while overcoming the expensive and problematic concerns facing this country and the rest of the world, specifically, the disposing of saline waters. It would further be desirable if this objective could be obtained while simultaneously meeting the above described needs.

SUMMARY OF THE INVENTION

Briefly, in accordance with the invention, I provide methods for economically and efficiently processing moderately saline waters, particularly brackish groundwater, treated sewage water and those saline waters produced as drainage from irrigation and from oil and gas wells, to produce an effluent containing lower sodium content but having increased salts of multivalent cations, particularly calcium and magnesium. I also provide methods for utilizing the effluent produced by water purification.

The process of the present invention provides for treating moderately saline water having 0.05% or more by weight of the salts of Na, K, Ca, Mg, Fe, Cl, $SO_4$, or $CO_3$ or combinations thereof and less than 1.00% by weight of the salts of Na, K, Ca, Mg, Fe, Cl, $SO_4$, or $CO_3$ or combinations thereof. The present invention is particularly suitable for treating water having high sodium content. The moderately saline water is then passed through an ion exchange resin saturated with multivalent cations to produce "useful water". As defined herein, the term "saturated" is interpreted in a loose sense to mean that the ion exchange resin has sufficient multivalent cations to effect an ion exchange for sodium to reduce the amount of sodium in moderately saline water.

Though the present process is not a water softening process, I have discovered that commercially available ion exchange media sold for water softening may be utilized for the practice of the present invention. Moreover, though I have not discovered a preferred ion exchange resin, I have determined that a resin called Lewatit C-249 from Sybron Chemicals, a division of Bayer Chemicals, is acceptable. It has also been found that chabasite, a group of minerals of the zeolite family consisting of a hydrous silicate of calcium and aluminum, is effective as an ion exchange media. A preferred chabasite can be obtained from GSA Resources. Other ion exchange media, such as synthetic zeolite, may also be useful.

For practicing the water treatment process of the present invention, the ion exchange media is saturated with multivalent cations. Various multivalent cations may be utilized. However, it is preferred that the multivalent cations are calcium ($Ca^{2+}$) or magnesium ($Mg^{2+}$) ions, or combinations thereof. Water softening media are often sold saturated with sodium which is unacceptable for practicing the present invention. To saturate the media with multivalent cations, calcium chloride or magnesium chloride solution may be utilized to flush the media until the media is sufficiently saturated with calcium and/or magnesium cations to effect an ion exchange for sodium.

The moderately saline water is passed through the ion exchange media to produce a useful effluent having decreased sodium cations compared to the moderately saline water. The useful effluent will also have higher calcium and magnesium. However, I have determined that the useful effluent can be utilized for both human and animal consumption. Moreover, I have determined that the useful effluent is also beneficial for treating soil for irrigation.

As the moderately saline waters passes through the ion exchange media, the sodium content of the media rises and the multivalent cation content lowers until the media is unacceptable for further water treatment in accordance with the present invention. To regenerate the ion exchange media, the media is flushed with a brine solution having more than 1.00% by weight of the salts of Na, K, Ca, Mg, Fe, Cl, $SO_4$, or $CO_3$. Preferably, the brine is particularly high in calcium and/or magnesium content and low in sodium. The brine solution is flushed through the ion exchange media until the amount of multivalent cations affixed to the ion exchange media is increased and the sodium affixed to the media is decreased until the ion exchange media is sufficiently saturated with multivalent cations to again process moderately saline water having high sodium content.

The recharge process increases the multivalent cations in the ion exchange media. However, the effluent produced from the recharge process has a significantly high sodium content. Advantageously, I have discovered that the recharge effluent waters which have a high sodium content are particularly suitable for soil stabilization, pond sealing and treating root rot. These high sodium waste waters are also suitable for use in cooling towers and laundry applications.

I have learned that waters produced from water purification, particularly those high in calcium and magnesium can be used to control dust and to irrigate farm land, or as additive to irrigation waters where the soil has a high sodium content. Moreover, I have discovered that useful effluent and recharge effluent can be processed to create both solid and aqueous mixtures which can be applied to roads and highways for deicing.

Accordingly, it is an object of the invention to provide cost effective means of processing moderately saline waters.

It is a also principal object of the invention to provide new methods for utilizing the useful water produced from water purification.

These and other, further and more specific objects and advantages of the invention will be apparent to those skilled in the art from the following detailed description taken in conjunction with the drawings.

DETAILED DESCRIPTION OF THE PREFERRED EMBODIMENTS

Figure 1:
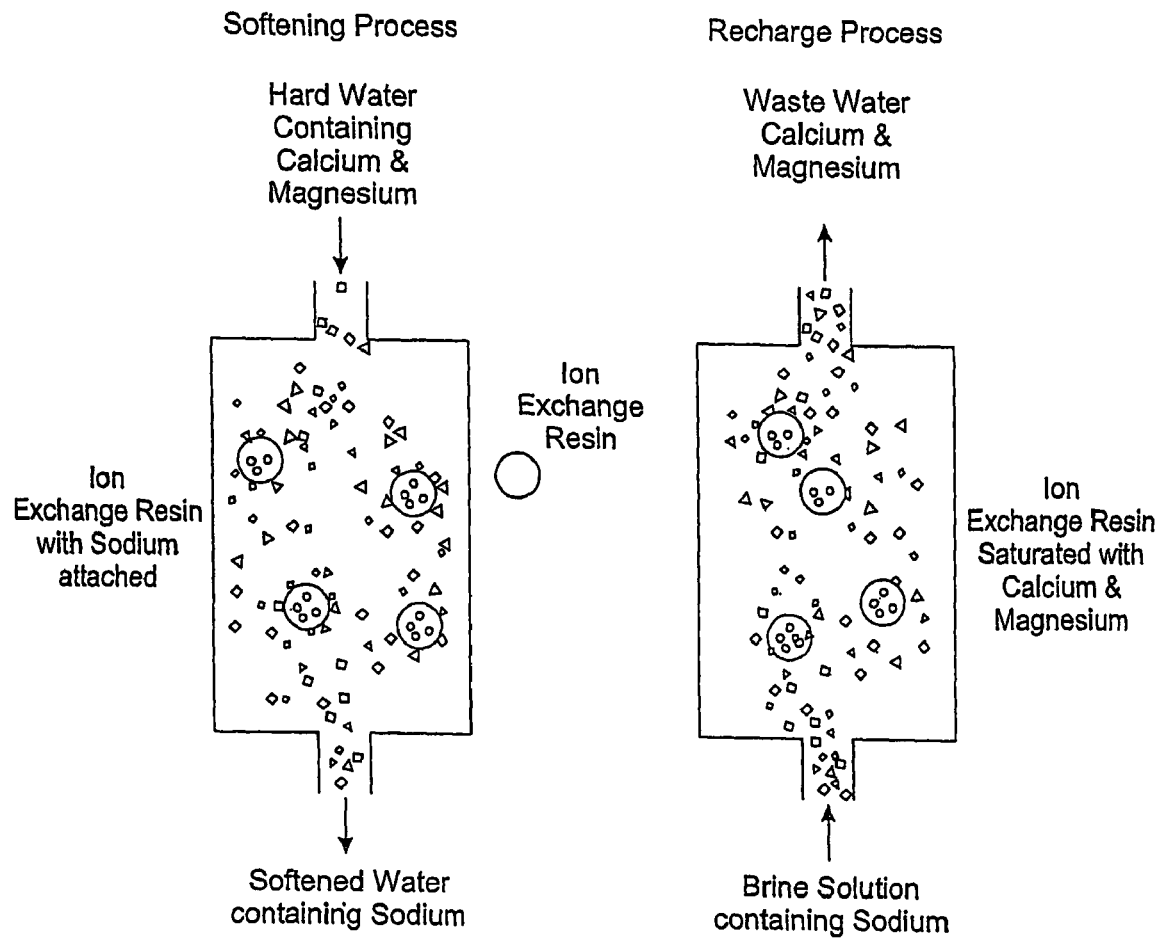
FIG. 1 is a flow chart illustrating the prior art process of water softening.

While the present invention is susceptible of embodiment in various forms, as shown in the drawings, hereinafter will be described the presently preferred embodiments of the invention with the understanding that the present disclosure is to be considered as an exemplification of the invention and it is not intended to limit the invention to the specific embodiments illustrated.

The presence of calcium and/or magnesium in water results in the water being considered "hard". These mineral ions in the water react with heat, plumbing and other chemical agents to reduce the cleaning effectiveness of laundry, dish washing and bathing applications. These calcium and magnesium ions also combine with carbonates, sulfates, oils and fat to create bathtub scum, spotted dishes, gray sheets, etc. In addition, hard water has been found to cause scaling of industrial water heaters and commercial boilers causing early substantial energy losses through impaired heat transfer and early shutdown for the removal of scale. Accordingly, there has been substantial effort to remove the "hardness" of the water.

With reference to FIG. 1, water softening is the removal of the "hardness" from the water which means predominantly removing or altering the calcium and magnesium ions from the water. Several methods for effecting water softening are known. The best known process for softening water is "ion-exchange". The hard water passes through a tank containing an ion exchange media, often containing beads which are microporous. The beads are saturated with sodium to cover both their exterior and interior surfaces. As the water passes through the media, an ion exchange process occurs. Ion-exchange entails the exchange of sodium, which is introduced into the water from the media, for calcium, magnesium, iron and other divalent mineral ions which are transferred out of the water and into a media. Calcium and magnesium ions attach to the media while the sodium on the media is released into the water. When the media approaches saturation with these hard ions, the media is regenerated, most often with solutions of sodium chloride leaving an effluent containing 3 to 25% sodium, calcium and magnesium salts which must be disposed of. The exact concentration of the effluent depends on the shop practice and, in particular, on the amount of rinse water included in the effluent, if any. Less often mineral acids like sulfuric acid or hydrochloric acid are used for water softening.

Meanwhile, I have discovered that the reversal of the water softening process can be practiced to treat moderately salty waters, particularly waters high in sodium content, to produce "useful waters" having higher calcium and magnesium content but lower sodium content. Because the process results in increased calcium and magnesium in the water, the process can be referred to as a "water hardening" process.

Figure 2:
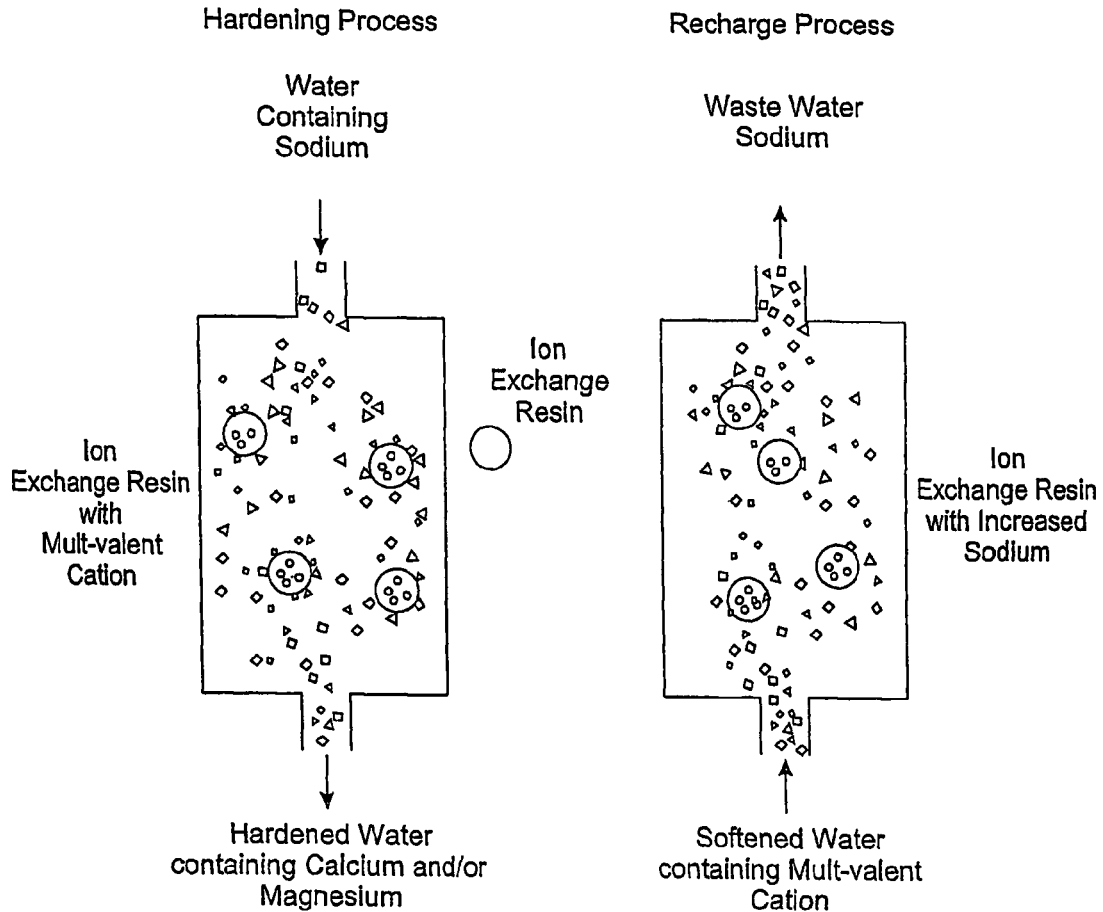
FIG. 2 is a flow chart illustrating the process of the present invention which produces water hardening.

With reference to FIG. 2, the process of the present invention passes the moderately saline waters through an ion exchange media. The media is pre-treated to be saturated with multivalent cations. Preferred multivalent cations include calcium ($Ca^{2+}$) or magnesium ($Mg^{2+}$) ions, or combinations thereof. The pretreatment can be achieved by various methods which can be selected by those skilled in the art. However, in a preferred embodiment, the media may be pre-treated using a calcium chloride or magnesium chloride solution to flush the media until it is properly saturated with calcium and/or magnesium cations. I have found that a resin of Lewatit C-249 from Sybron Chemicals can be generated using a 13% solution of calcium chloride flushed at a rate of eight (8) lbs of calcium chloride per cubic foot of resin. Alternatively, I have found that a media of chabasite received in the sodium form can be regenerated using a 15% solution of calcium chloride at a rate of eight (8) pounds of calcium chloride per cubic foot of zeolite. Other ion exchange media, regenerative solutions and flushing rates may also be employed as can be determined by those skilled in the art after consideration of this disclosure.

The moderately saline water is passed through the ion exchange media to produce a useful effluent having decreased sodium cations compared to the pre-treated moderately saline water. The useful effluent will also have higher calcium and magnesium. As the moderately saline waters passes through the ion exchange media, the sodium content of the media rises until the media is unacceptable for further water treatment in accordance with the present invention. To regenerate the ion exchange media, the media is flushed with a brine solution having more than 1.00% by weight of the salts of Na, K, Ca, Mg, Fe, Cl, $SO_4$, or CO3. Preferably, the brine is particularly high in multivalent cation content, such as calcium and/or magnesium, but low in sodium content. The brine solution is flushed through the ion exchange media until the amount of multivalent cations affixed to ion exchange media is increased and the sodium is decreased until the ion exchange media is sufficiently saturated with multivalent cations to again process moderately saline water in accordance with the present invention.

Though not preferred, in an additional embodiment the moderately saline water may be pre-treated using known water treatment techniques prior to undergoing the water "hardening" process of the present invention. For example, where the water has significant levels of calcium and magnesium, as well as sodium, the water is preferably processed through a known water softening process to remove as much calcium and magnesium as possible. Advantageously, the removal of the calcium, magnesium and other multivalent cations before the hardening treatment helps prevent the creation of precipitates which bind to membranes if membrane filtration is also utilized.

The method of treating water of the present invention will now be further explained in and by the following examples.

EXAMPLE 1

Moderately saline well water is pumped from the Wonder Valley area, east of Twenty Nine Palms, Calif. Water from the well is measured at 1950 ppm TDS and water analysis reveals the following results.

| Pre-Treatment - Moderately Saline Water | |
|---|---|
| Cations | Results (ppm) |
| Calcium | 51 |
| Magnesium | Not detected |
| Sodium | 700 |

Figure 3:
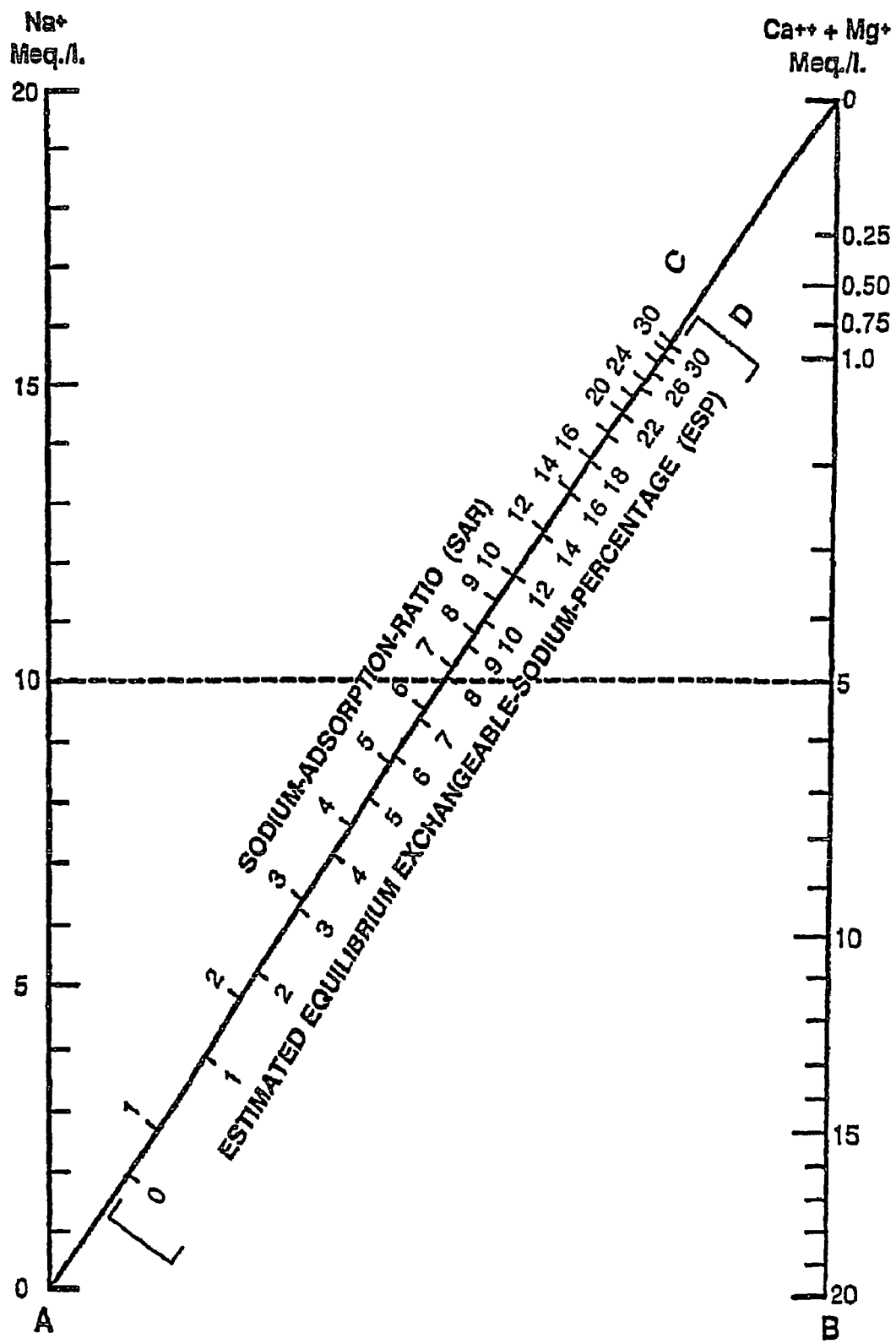
FIG. 3 is a chart illustrating the sodium absorption ratio (SAR) of irrigation waters.

Using the chart of FIG. 3 reveals that the water has an SAR value of 29.

The well water is hardened by passing it through an ion exchange resin of Lewatit C-249 from Sybron Chemicals which has been saturated with calcium cation using a 13% solution of calcium chloride flushed at a rate of 15 lbs of calcium chloride per cubic foot of resin. After treatment, water analysis reveals the following results.

| Post-Treatment - "Useful" Water | |
|---|---|
| Cations | Results (ppm) |
| Calcium | 410 |
| Magnesium | 1.4 |
| Sodium | 380 |

Using the chart of FIG. 3 reveals that the water now has an SAR value of 5.0.

EXAMPLE 2

Moderately saline irrigation drainage water from Red Rock Ranch, Calif. is provided by the Department of Water Reclamation ("DWR"). The water is initially measured to have 5600 ppm TDS and water analysis reveals the following results.

| Pre-Treatment - Moderately Saline Water | |
|---|---|
| Cations | Results (ppm) |
| Calcium | 530 |
| Magnesium | 110 |
| Sodium | 1400 |

Because the chart of FIG. 3 cannot be used to reveal SAR value of the water, numerical calculations were performed to determine that the SAR is approximately 15.2.

As a result of its high initial calcium and magnesium levels, it is decided that the DWR water will undergo both a water softening process and a water hardening process. The water is treated through a water softening process to lower the calcium and magnesium levels to below 5 ppm as reflected in the following results.

| Moderately Saline Water After Water Softening | |
|---|---|
| Cations | Results (ppm) |
| Calcium | Not detected |
| Magnesium | Not detected |
| Sodium | 2200 |

The extremely high sodium level and low calcium and magnesium levels results in an "off-the-chart" SAR level.

The DWR water is then hardened by passing it through an ion exchange resin of Lewatit C-249 from Sybron Chemicals which has been saturated with calcium cation using a 13% solution of calcium chloride flushed at a rate of 15 lbs of calcium chloride per cubic foot of resin. After treatment, water analysis reveals the following results.

| Post-Treatment - "Useful Hardened Water" | |
|---|---|
| Cations | Results (ppm) |
| Calcium | 940 |
| Magnesium | 2.3 |
| Sodium | 1100 |

Using the chart of FIG. 3 reveals that the water now has an SAR value of 4.9.

Irrigation With "Hardened" Waters

All irrigated areas suffer from a buildup of sodium. Plant evaprotranspiration and plant growth use about 70 to 90% of the irrigation water and the sodium is concentrated in the remaining 10 to 30% of the water. This water must be washed from the roots or plant growth suffers.

Calcium and Magnesium, when adsorbed on clays, have very little affinity for water while sodium ions adsorbed on clays have a very strong affinity for water. The affinity of sodium ions adsorbed on clays is strong enough to spread clay particles, and clays are said to "swell". The more sodium ions in soil water, as compared to the concentration of calcium and magnesium ions, the higher the percentage of the ion exchange sites that will be occupied by sodium. This causes a greater attraction of water and the soils swell more. However, experimentation has found that there is a stopping point to the soil swelling. When about 14-16% of the change sites are occupied by sodium ions, the clay particles disperse into small units and the swelling is lost and the soil packs tightly. The clay particles plug most of the pores that remain in the soil and this further restricts the movement of air, water and nutrients and the soil's productivity is lost. U.S. Salinities Laboratory calculated the amount of ion exchange sites that would be occupied by sodium based on the amount of calcium and magnesium present. These calculations were named the Sodium Adsorption Ration (SAR).

As shown in FIG. 3, the sodium buildup is predicted by the sodium absorption ratio (SAR) vs. the total salinity of the irrigation water. To use the chart in FIG. 3, the sodium concentration is marked on the left side of the nomogram. The calcium plus magnesium concentration is then marked on the right side of the nomogram. Drawing a straight line between the two marks identifies the SAR value where the line intersects the sodium adsorption scale. Due to the inverse relationship between the addition of sodium to calcium and magnesium, an increase in calcium and/or magnesium will actually lower the SAR value of the irrigation water. Though some plants are much more tolerant of high sodium content in the soil, generally a SAR value of 14 or more will cause a dispersion of the clay content within the soil and a corresponding loss in productivity.

With reference to Examples 1 and 2, the moderately saline waters are tested and determined to have SAR values of 29 and 15.2, respectively. Clearly, use of these waters for irrigation would have a harmful impact on soil productivity. However, after the hardening process of the present invention, the waters are found to have SAR values of 5.0 and 4.9, respectively, which are much more conducive for irrigation. By using the waters having an increased calcium and magnesium content as irrigation water reduces the buildup of exchangeable sodium in the soil thereby maintaining the soil in proper sodium equilibrium. Moreover, the process produces water which will optimize the SAR of soil moisture in the root zone of plants while decreasing the soil's salinity. This decrease in salinity is particularly advantageous because the prior art practices of adding calcium and magnesium salts or sulfuric acids causes an undesirable increase in soil salinity.

EXAMPLE 3

An ion exchange media is prepared by forming a column of chabasite within a 6 foot tube having a nominal interior diameter of 1.625 inch. The tube is filled with chabasite to produce a column 38 inches high after washing and regeneration. The chabasite, received in the sodium form, is saturated with calcium cation using a 15% solution of DowFlake brand calcium chloride at the rate of eight (8) pounds of calcium chloride per cubic foot of media. The column is then "broken in" by using it to remove sodium from brackish groundwater. Following the "breaking in" period, the ion exchange media is again regenerated using the 15% solution of DowFlake brand calcium chloride at the rate of eight (8) pounds of calcium chloride per cubic foot of media.

Solutions of sodium chloride are made using salt analyzed by EPA tests as being 6 ppm total Calcium plus Magnesium. The calculated amounts are checked with a Hach Sensioji 5 Meter as calibrated with a Hach Standard solution containing 1000 mg/l of sodium plus or minus 10 mg/l. The meter reads on the high side, but within 3%, and is used without further adjustment. Hardness of the solutions after ion exchange are checked using Hach Kit 5 B with the hardness results reported as Grains of Calcium Carbonate.

The pre-treated water having negligible hardness is found to have sodium chloride levels of 760 mg/l, 1206 mg/l and 1640 mg/l, respectively. Following treatment through the ion exchange media, the treated water is found to have the following hardness properties.

| Water Pre-Ion Exchange Treatment | Post-Ion Exchange Treatment |
|---|---|
| 760 mg/l as sodium chloride with nil hardness | average of 7 grains hardness |
| 1206 mg/l as sodium chloride with nil hardness | average of 15 grains hardness |
| 1640 mg/l as sodium chloride with nil hardness | average of 25 grains hardness |

Because each grain increase in hardness is accompanied by removal of a grain of sodium, these measurements reflect significant improvement in water quality, producing water suitable for irrigation and drinking water for livestock. The mineralized water is also acceptable for human consumption such as for use in areas where children need calcium for bone development and milk is not available in sufficient quantities.

Animal Consumption of "Hardened" Waters

While the U.S. Environmental Protection Agency ("EPA") recommends that the salt content of drinking water for humans be limited to 500 ppm TDS, for most animals such as livestock, 1000 to 1500 ppm is tolerable. Moreover, the less sodium in the water, causes a corresponding increase in the total salt content that is tolerable to both humans and livestock.

Meanwhile, whole milk has much higher salt content than approved drinking water. The average concentrations of milk salt constituents are listed as follows.

Whole Milk

| Constituent | Results (ppm) |
|---|---|
| Calcium | 1230 |
| Magnesium | 120 |
| Sodium | 580 |

As a result of diets in many parts of the world, children are very deficient in calcium and/or magnesium. For many children, milk is not available. In addition to children, animals such as livestock are also in need of water, calcium and/or magnesium. Thus, it would be desirable if the drinking water supply in impoverished areas could provide the calcium and/or magnesium where milk is unavailable or unaffordable.

With reference to Examples 1 and 2, water processing of the present invention produces water having salt contents comparable to whole milk. Moreover, the saline waters of Examples 1 and 2 contain TDS significantly higher than billions of gallons of moderately saline waters across world. Processing of the moderately saline waters in accordance with the practice of the present invention would produce waters having even lower salt contents.

In many areas of the-world, the only water supplies available are saline. However, the water can be improved upon by lowering the sodium while increasing the calcium and/or magnesium content by processing the available saline water in accordance with the process of the present invention.

Other Uses For "Hardened" Waters

In addition to use the water for human and livestock consumption, the useful effluent produced by practicing the hardening process of my invention can be utilized for various purposes. For example, I have learned that the waters produced from my water purification process, particularly those waters high in calcium and magnesium can be used to control dust. Moreover, I have discovered that useful effluent waters can be processed to create both solid and aqueous mixtures which can be applied to roads and highways for deicing.

The recharge process increases the multivalent cations in the ion exchange media. However, the effluent produced from the recharge process has a very high sodium content. Advantageously, I have discovered that the recharge effluent waters which have a high sodium content are particularly suitable for soil stabilization, pond sealing and treating root rot. These high sodium waste waters are also suitable for use in cooling towers and laundry applications.

Having described the invention in such terms as to enable one skilled in the art to make and use it and having identified the presently best mode of practicing it, I claim:

1. A method of treating water comprising the steps of:
providing moderately saline water having substantially 0.05% or more by weight and having less than 1.00% by weight of the salts of Na, K, Ca, Mg, Fe, Cl, $SO_4$, or $CO_3$ or combinations thereof;
providing an ion exchange media saturated with a multivalent cation;
passing the moderately saline water through the ion exchange media to produce an effluent having more multivalent cations and less sodium than the moderately saline water;
providing a brine solution having more than 1.00% by weight of the salts of Na, K, Ca, Mg, Fe, Cl, $SO_4$, or $CO_3$;
passing the brine solution through the ion exchange media until the ion exchange media is sufficiently saturated with multivalent cations to again process moderately saline water having high sodium content; and
utilizing the effluent.

2. The method of treating water of claim 1 wherein said ion exchange media includes zeolite.

3. The method of treating water of claim 1 wherein said ion exchange media includes chabasite.

4. The method of treating water of claim 1 wherein said step of utilizing the effluent includes providing the effluent to human beings or non-human animals for consumption.

5. The method of treating water of claim 1 wherein said step of utilizing the effluent includes applying the effluent to soil.

6. The method of treating water of claim 1 wherein said multivalent cation includes calcium.

7. The method of treating water of claim 1 wherein said multivalent cation includes magnesium.

8. The method of treating water of claim 1, wherein the SAR of the moderately saline water is at least 14 and the SAR of the effluent is less than 14.

9. The method of treating water of claim 1, wherein the SAR of the moderately saline water is at least approximately 29 and the SAR of the effluent is less than approximately 5.0.

10. A method of treating water comprising the steps of:
providing moderately saline water having substantially 0.05% or more by weight and having less than 1.00% by weight of the salts of Na, K, Ca, Mg, Fe, Cl, $SO_4$, or $CO_3$ or combinations thereof;
providing an ion exchange media saturated with sodium;
passing the moderately saline water through the ion exchange media saturated with sodium to produce a softened water having fewer multivalent cations and more sodium than the moderately saline water;

providing an ion exchange media saturated with a multivalent cation;

passing the softened water through the ion exchange media saturated with a multivalent cation to produce an effluent having more multivalent cations and less sodium than the moderately saline water;

providing a brine solution having more than 1.00% by weight of the salts of Na, K, Ca, Mg, Fe, Cl, $SO_4$, or $CO_3$;

passing the brine solution through the ion exchange media until the ion exchange media is sufficiently saturated with multivalent cations to again process moderately saline water having high sodium content; and utilizing the effluent.

11. The method of treating water of claim 10 wherein said ion exchange media includes zeolite.

12. The method of treating water of claim 10 wherein said ion exchange material includes chabasite.

13. The method of treating water of claim 10 wherein said step of utilizing the effluent includes providing the effluent to animals for consumption.

14. The method of treating water of claim 11 wherein said step of utilizing the effluent includes applying the effluent to soil for irrigation.

15. The method of treating water of claim 10 wherein said multivalent cation includes calcium.

16. The method of treating water of claim 10 wherein said multivalent cation includes magnesium.

17. The method of treating water of claim 10 wherein the SAR of the moderately saline water is at least approximately 15.2 and the SAR of the effluent is less than approximately 4.9.

18. A method of treating water comprising the steps of:

providing moderately saline water having salts at a concentration of approximately 1950 ppm TDS, the salts being Na, K, Ca, Mg, Fe, Cl, $SO_4$, or $CO_3$ or combinations thereof;

providing an ion exchange media saturated with a multivalent cation;

passing the moderately saline water through the ion exchange media to produce an effluent having more multivalent cations and less sodium than the moderately saline water;

providing a brine solution having more than 1.00% by weight of the salts of Na, K, Ca, Mg, Fe, Cl, $SO_4$ or $CO_3$;

passing the brine solution through the ion exchange media until the ion exchange media is sufficiently saturated with multivalent cations to again process moderately saline water having high sodium content; and utilizing the effluent.

19. The method of treating water of claim 18, wherein the sodium concentration of the moderately saline water is at least approximately 700 ppm.

20. The method of treating water of claim 18, wherein the SAR of the moderately saline water is at least 14 and the SAR of the effluent is less than 14.

21. The method of treating water of claim 18, wherein the moderately saline water has negligible hardness and has a sodium chloride level of at least approximately 760 mg/l 1640 mg/l and the effluent has at least approximately 7 grains hardness.

22. The method of treating water of claim 18, wherein the moderately saline water has negligible hardness and has a sodium chloride level of at least approximately 1640 mg/l and the effluent has at least approximately 25 grains hardness.

* * * * *